June 26, 1962 A. CHRISTENSEN 3,041,152
APPARATUS FOR HIGH TEMPERATURE AND PRESSURE CHEMICAL REACTIONS
Filed Feb. 21, 1957
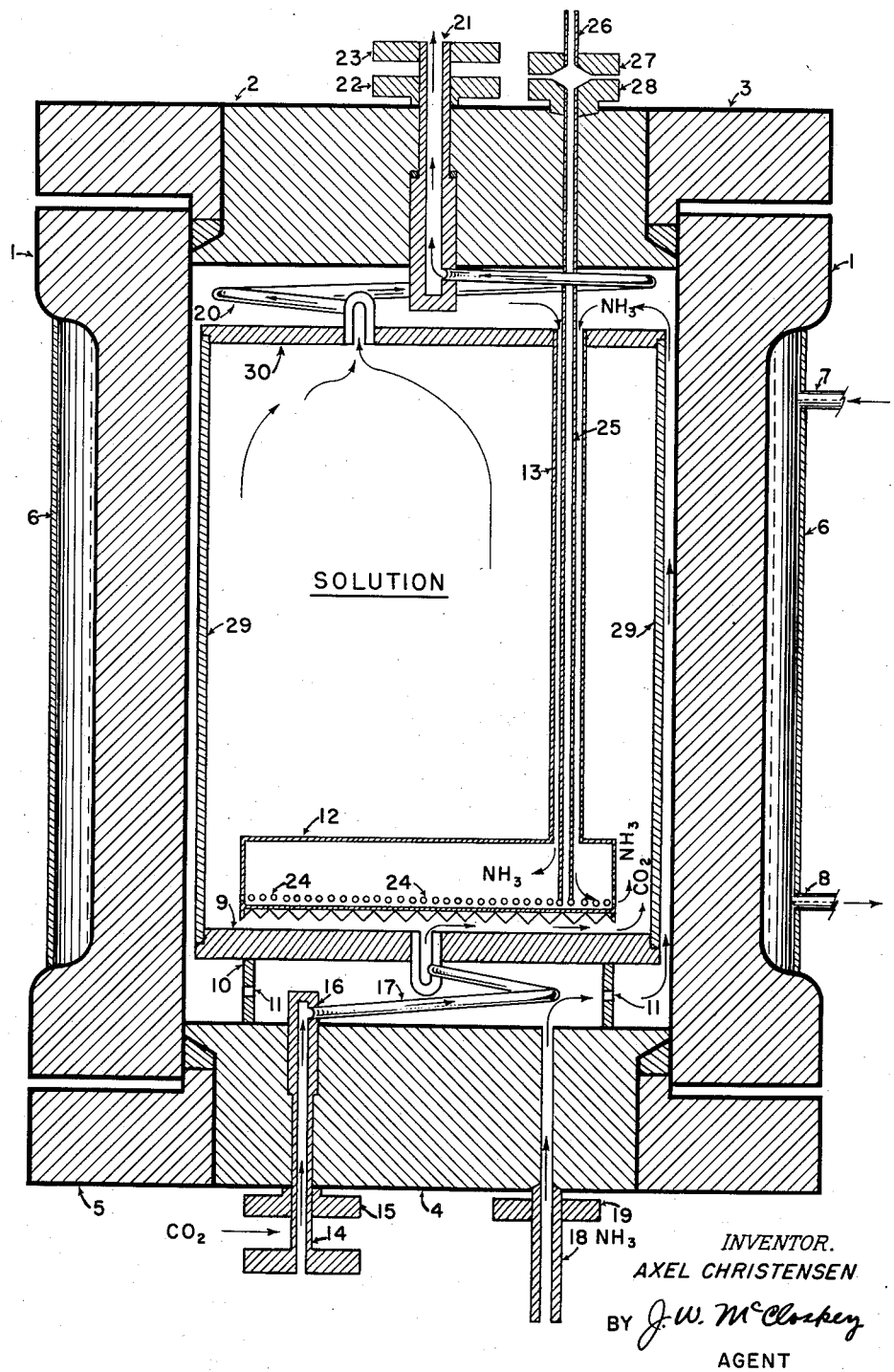
INVENTOR.
AXEL CHRISTENSEN
BY J.W. McCloskey
AGENT

United States Patent Office 3,041,152
Patented June 26, 1962

---

3,041,152
APPARATUS FOR HIGH TEMPERATURE AND PRESSURE CHEMICAL REACTIONS
Axel Christensen, Stamford, Conn., assignor to Chemical Construction Corporation, New York, N.Y., a corporation of Delaware
Filed Feb. 21, 1957, Ser. No. 641,743
3 Claims. (Cl. 23—290)

This invention relates to an apparatus for carrying out chemical reactions under high temperatures and pressures. It is further concerned with the method and apparatus for reacting a non-corrosive fluid with fluids which are in themselves corrosive or fluids which react with the non-corrosive fluid to form a corrosive solution. More particularly it is concerned with an improved apparatus for synthesis of urea from ammonia and carbon dioxide.

The construction of apparatus for carrying out the above synthesis reactions at high temperatures and exceedingly high pressures, which involves the presence of corrosive fluids, has constantly presented problems both in the type of equipment to be used and in materials of construction. Heretofore it has been customary in the manufacture of chemicals from gases and/or fluids; for example, the synthesis of ammonia from nitrogen and hydrogen which involves high temperatures and pressures, to construct the reaction vessels or autoclaves of carbon steels or low alloy steels. Generally these autoclaves are elongated, thick-walled vessels capable of withstanding pressures which exist or develop therein during synthesis. The vessels usually consist of heavy forgings joined together with pressure tight seals but in some cases the cylindrical section of the shell may be constructed by wrapping layers of metal plates around a thin-walled cylinder or by winding bands of steel around such a cylinder. At pressures of several hundred atmospheres the problem has been chiefly to insure that the walls and the heads of the pressure vessel are of sufficient thickness and strength to withstand the pressures that are necessary for the synthesis reactions. This situation arises only when the materials being introduced into the autoclave are in themselves non-corrosive or do not produce on reaction a substance which is corrosive. When corrosive substances are encountered there is in addition to the problem of providing sufficient strength to withstand the pressure involved, the problem of providing for resistance to these corrosive solutions which come in contact with the inner walls of the autoclave. Generally the corrosion problem has been alleviated by shrink fitting the shell of the autoclave onto a liner made of a corrosion resistant material. For some chemical reactions, particularly the synthesis of urea by the reaction of ammonia with carbon dioxide, the customary practice is to lead-line or to silver-line the autoclave. Other alloys have been found to be resistant to corrosion effects of urea, but in practice they have failed because the coefficient of expansion of the non-corrosive alloy is considerably different from that of the steel alloy shell, thereby setting up stresses within the autoclave during reaction. During reaction these corrosion resistant alloys which have been used for linings in the urea autoclave become deformed and pull away from the wall of the shell, thereby permitting corrosive liquids to reach the shell.

The problems involved in fabricating a pressure vessel which will resist high pressures as well as corrosion will be illustrated with relationship to the production of urea. Urea is produced in commercial operations by reaction of ammonia with carbon dioxide at high temperature and pressure to yield ammonium carbamate according to the following equation:

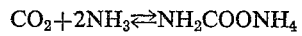

At the temperatures and pressures utilized within the autoclave some of the ammonium carbamate breaks down to form urea and water according to the following equation:

The overall result of the above reactions is exothermic. Furthermore, the ammonium carbamate in the mixture of reactants and reaction products is very corrosive to the ordinary materials of construction such as the carbon steels and low alloy steels which would normally be used in pressure vessels. Even stainless steels are adversely affected by the corrosive carbamate solutions. In view of this corrosive nature of the carbamate solution, the art has had to resort to expedients outlined above wherein the autoclave has been lead-lined or silver-lined. The lead lining is generally unsatisfactory because at the temperatures within the autoclave there is a tendency for the lead to creep, thus thinning out the lead liner to the extent that the liner fails to protect the outer steel shell from the corrosive effects of the carbamate solution. Another disadvantage with lead linings is that good seals between the end plates and the cylindrical section are hard to obtain. Furthermore, lead linings are practical only when the resulting urea product is to be used for fertilizer. If the urea is to be used as a feed or in production of plastics, the lead liner is somewhat unsatisfactory since a certain amount of the lead is dissolved which enters into the final urea product. If a pure product is desired, then the final urea product will have to be recrystallized. Silver linings are generally satisfactory and are used when a pure urea product is desired. The chief difficulty with silver linings is the expense involved when the heavy steel shells of the autoclave are plated with silver by electrolytic deposition. A great amount of care during deposition of the silver is necessary to insure that no pin holes remain in the silver lining which will permit access of the ammonium carbamate solution to the outer low alloy steel shell. A further disadvantage of the above linings is that if for some reason the liner fails, the repair job will be exceedingly expensive and difficult.

The disadvantages outlined above have been overcome by the novel apparatus and operation of said apparatus which will be described below. This apparatus is made up of the customary shell and headers, but the material which is used within the autoclave to resist corrosion is not there as a tight lining against the inner surface of the shell but is there as a loosely fitting container set within the shell. This inner container is so constructed as to permit the fluid to flow around the container and into the container, thereby equalizing the pressures within the system. This prevents unequal pressures within the autoclave system with subsequent damage to the inner container. As the non-corrosive fluid is allowed to flow into the autoclave around the outer portion of the non-corrosive container and thence into the interior of said container, it reacts with another material pumped directly therein, either to form a corrosive solution or react with a solution which is in itself corrosive. By maintaining a continuous flow of the non-corrosive fluid into the inner container, the second reactant is not permitted to flow out of the container where it would come in contact with the easily corroded inner surface of the shell. To ascertain whether any corrosive materials have escaped from the inner container to the space between the inner container and the shell, a constant stream of the non-corrosive fluid is taken from the inner container. This acts as a test to determine whether any of the second reactant or products of reaction are being delivered to the outer portion of the container. This test will indicate whether there is a flow failure of the non-corrosive fluid or whether the inner container has developed a leak.

This invention is described chiefly in relation to the synthesis of urea, but it is to be understood that the method and apparatus would broadly apply in any situation wherein a non-corrosive fluid is reacted at high pressures with a corrosive fluid or with another fluid which reacts with the non-corrosive fluid to produce a corrosive liquid.

The object of this invention is to carry out chemical reactions at high temperatures and pressures within autoclaves where at least one of the reactants is corrosive or the product of the reaction is corrosive.

Another object of the invention is to provide a pressure vessel which has an inner corrosion resistant container for carrying out chemical reactions and which provides easy access to the container for repairs or replacement.

A still further object of the invention is to provide an apparatus and method for synthesizing urea, using apparatus which is not easily corroded by the products of reaction.

The accompanying FIGURE depicts this novel autoclave which is described below as to the various parts of the structure as well as its relationship to an improved urea process.

The reaction vessel or autoclave comprises outer shell 1 with closures at either end illustrated by the heads 2 and 4 and the sealing rings 3 and 5. Any type of conventional closure may be used on this autoclave, but there is preferably shown here a self-sealing type of closure which includes a gasket material shown but not numbered. In some instances the shell need be provided with only one closure since the inner container can be removed and replaced through the upper end of the pressure vessel in which case the bottom end of the vessel will be integral with the cylindrical section. The shell is surrounded by a jacket 6 with inlet and outlet pipes 7 and 8 to provide steam whenever necessary to heat up the autoclave to reaction temperatures or to cool the autoclave in the event too much heat is developed during reaction. Within the autoclave there is loosely placed an inner corrosion resistant reaction container or chamber with side walls 29, a bottom plate 9 and top plate 30. This container rests on a ring support 10 with holes 11 in the cylindrical wall. The material for this inner container can either be a lined reaction chamber or an unlined reaction chamber fabricated from materials which resist the corrosive effects of the reactants and/or reaction products. This inner container may be of titanium or lead or said container may be lined with silver if a pure reaction product is desired. Furthermore, the container may be fabricated from such alloys as copper base alloys which are known to be effective in resisting corrosion but which heretofore have been little used in commerical practice. The reason for this non-use of suitable alloys in the previous autoclaves wherein the lining is tightly bound to the shell is that there is a marked difference in the coefficient of expansion between these alloys and the shell material which sets up stresses within the autoclave to the detriment of the lining material. In the present apparatus, however, the inner container is loosely placed within the autoclave so that said inner container walls are spaced apart from the inner walls of the shell. Consequently, any changes in size due to expansion upon heating and cooling will have no effect upon the materials of construction.

A non-corrosive fluid is delivered into the autoclave through the port line 18 which is fastened to the head 4 by a flange 19 conventionally fixed thereto. This fluid then flows around the container defined by walls 9, 29 and 30 and down into the inner reaction chamber through the tube 13 and a dependent cylindrical distributor 12 attached to the lower end of tube. Only one tube 13 is illustrated in the drawing, but it is obvious more than one tube could be used to support the distributor 12. This cylindrical distributor 12 is closed on the lower side and contains perforations 24 which allow the non-corrosive fluid to flow there-through into the interior of the reaction chamber. The other reactant material is delivered into the reaction chamber through tube 14 which is fastened to the head plate 4 by flange 15. This tube 14 is shown with an enlarged section 16, which when drawn tight against the gasket, shown but not numbered, by the operation of flange 15 seals the tube tight into the head 4. Attached to the enlarged portion 16 is a tube 17 which transmits the fluid from 14 into the reaction chamber. This tube is of such configuration that it provides a slightly flexible connection to accommodate any changes within the autoclave due to raising or lowering of temperature within said autoclave. The fluid which flows into the lower end of the container 29 enters into the space below the distributor 12. The bottom plate of the distributor and the serrated curtain wall at the edge of this plate guides this fluid to the annulus between the distributor 12 and container wall 29. Furthermore, the fluid which flows into the lower end of the inner container through line 17 is not permitted to flow into this distributor 12 because the pressure of the non-corrosive gas flowing down through tube 13 and out perforations 24 is held at a pressure which prevents the entrance of the second reactant into the interior of the distributor. Within the reaction chamber the non-corrosive fluid flows out through the perforations 24 and mixes with the second reactant being delivered to the reaction chamber through tube 17. Thereupon the chemical reaction takes place between the reactants under the influence of the temperatures and pressures utilized in the particular process. After the reaction has been substantially accomplished, the products of reaction, plus any unreacted materials, flow upwardly and out of the reaction chamber through the tube 20 which is also flexible in the same manner as tube 17. The tube 20 connects the head plate 30 of the reaction chamber with the outlet tube 21. This tub is drawn tightly to the upper head 2 by flange 22. The tube 21 can then be fastened to other piping to carry off the reaction products by means of the second flange 23. All the tubes and fittings recited above can be made from suitable corrosion resistant material but it is preferred that said tubes and fittings be fabricated from "Monel" and silver plated.

As a precautionary measure the sampling tube 25, generally having an inside diameter of about ⅛ inch, is fitted into the reaction chamber through tube 13 in such fashion that the lower end of tube 25 extends down into the distributor 12 to a point approximately level with the perforations 24. This tube 25 is fastened to the head 2 by means of a flange 28. The tube 25 is then connected to a test cell for continuous testing of the fluid from within the distributor by means of tube 26 and a second flange 27 which corresponds to flange 28. While the tube 25 is preferably placed within the tube 13, it should be understood that the tube 25 could be placed in some other position just so long as the tube extends through the shell and into the distributor 12 until the lower end of the tube 25 is adjacent the perforations 24. The purpose of this sampling tube 25 is to determine whether there is any diminishing or failure of flow of the non-corrosive reactant fluid or whether there is any failure of the inner reaction chamber. In the event the flow of the fluid entering through tube 18 fails, the other reactant will be allowed to rise into the distributor to the extent that if such action continues the second reactant which is corrosive, or the products of reaction which are corrosive, will pass through tube 13 to spill out into the space between the shell and the corrosion resistant chamber. As the corrosive materials rise in the distributor and reach the bottom inlet of the sampling tube, part of the corrosive material will flow to the test cell, causing an alarm to be given. In the event there is a failure of the wall of the inner container, as wall 29, which will permit escape of corrosive fluid from the inner container into the space between the wall 29 and the shell 1, then the corrosive fluid will flow around the outer wall of the inner container and down the tube 13 to the distributor 12. Here a portion of the fluid will flow through the tube 25 to a test cell. The change of composition in the test stream will then actuate a warning signal in the same manner as if there was a failure in the supply of non-corrosive fluid.

The test cell which is not illustrated is a conventional means for continuously determining one of the ingredients in the gas composition stream flowing out of tube 25. If there is any change in the composition this test unit will transmit an electrical signal to a control which in turn will act to control pumps delivering the reactants to the autoclave. In case urea is being produced by the reaction of ammonia and carbon dioxide, a steady flow of ammonia will pass through tube 25 to an ammonia analyzer. This analyzer may either be a thermo-conductivity cell or an infra red cell, both of which are commonly used to actuate control equipment for regulating or stopping the flow of reactants. When carbon dioxide or carbamate enters the distributor 12 and flows up through the sampling tube 25, the change in constitution of ammonia will cause the analyzer to either regulate the flow of reactants into the autoclave or completely shut off all flow of the ammonia and carbon dioxide.

*Example*

Describing the operation with respect to production of urea by reaction of ammonia and carbon dioxide, there is introduced into such autoclave ammonia and carbon dioxide in the ratio of 6 mols of ammonia to 1 mol of carbon dioxide through tubes 18 and 14 respectively. This represents the use of about 200% excess ammonia which in turn increases the conversion of the ammonium carbamate to urea. The operation is carried out under temperatures of about 185° C. and at a pressure of 280 atmospheres (approximately 4100 p.s.i.g.). The ammonia in this operation circulates through the space between the shell and the inner corrosion resistant container and into the interior of the container through the tube 13 to be distributed through 12. Thereupon the ammonia reacts with the carbon dioxide that is pumped directly into the inner container through pipe 17. Under the conditions of temperature and pressure set forth above, the ammonia begins to react with the carbon dioxide as soon as the ammonia passes through the perforations 24 into the interior of the inner reaction chamber. At this temperature and pressure the ammonium carbamate which is formed breaks down into urea and water, but since it is a reversible reaction about 83% of the ammonium carbamate is converted to urea and water. As the reactants form a urea-ammonium carbamate solution, the solution flows upwardly and out of the inner container through pipes 20 and 21 to other apparatus where the urea is recovered from the ammonium carbamate. Concurrently with the flow of ammonia from the distributor into the interior of the reaction chamber, a continuous stream of ammonia is taken off through the tube 25. This stream of ammonia flows through an ammonia analyzer to determine whether any carbon dioxide or corrosive carbamate solution has entered the distributor and the sampling tube 25. This stream of ammonia, after passing through the analyzer, is returned to ammonia storage where it is recycled back to the autoclave for reaction with carbon dioxide. If ammonia containing some carbon dioxide does reach the analyzer, said analyzer will either indicate to an operator by light and/or sound that the ammonia-carbon dioxide system is unbalanced or preferably actuate valves by conventional electrical means to shut off flow of ammonia and carbon dioxide to the autoclave.

The present invention represents a distinct improvement chiefly in that the corrosion resistant section of the autoclave is much more easily repaired or replaced than the liners used in the prior art autoclaves. In the preferred arrangement of parts illustrated in the drawing, the flanges attaching pipes 14 and 21 to plates 4 and 2 respectively can be removed to free said pipes. Thereafter head plate 2 with sealing ring 3 can be removed from the shell 1. This leaves the inner corrosion resistant container with attached piping accessible to be removed and repaired or replaced by a new container. A further advantage of this invention is that cheaper materials, such as copper base alloys, can be used for the corrosion resistant section of the autoclave without suffering from the disadvantages attendant to their use as a tight fitting autoclave liner. In addition, there is also the obvious advantage that the capital cost of the autoclave, plus the loose liner of this invention, will be considerably less than the autoclave with the shrink fitted liner or plated lining of the prior art.

I claim:

1. The apparatus for carrying out chemical reactions under high pressures and temperatures between a non-corrosive fluid and a second reactant fluid, said second reactant fluid from the group consisting of fluids which are corrosive and fluids which react with the non-corrosive fluid to form a corrosive fluid, said apparatus comprises an outer pressure resisting shell sealed to atmosphere to prevent flow of fluid out of apparatus, said shell having at least a removable top cover, a removable inner container within said shell, said inner container being spaced apart from the inner walls of said shell and having at least an inner wall of said inner container resistant to the corrosive effects of fluids present therein, said inner container being in a fluid impervious relation with an annular flow path of non-corrosive fluid between the shell and the inner container, means for delivering a non-corrosive fluid under pressure to the space between the shell and the inner container to flow around the outside of the inner container, at least one ingress means to conduct said non-corrosive fluid from said space to the inner container, said ingress means comprising at least one conduit dependent from and attached to a top wall of the inner container and extending to a point adjacent the bottom wall of the inner container and having a distributor appended to the lower end of the conduit, said conduit opening into said space between the removable top cover and the top of the inner container to admit fluid into the interior of said inner container and said distributor having top, bottom and side walls, said walls being imperforate except in the top wall at the point of attachment to the dependent conduit and the exit perforations in the side walls adjacent the bottom wall, means for delivering a second reactant fluid to the inner container from a point outside the shell to a point beneath the distributor, exit means to remove the reaction product from the upper portion of the inner container and out through the removable top cover, and a sampling tube extending from a position adjacent the outside wall of the shell to a position within and adjacent the lower edge of the distributor.

2. The apparatus according to claim 1 in which the sampling tube is located within an ingress conduit means.

3. The apparatus according to claim 1 used for carrying out the synthesis of urea under high temperature and pressure wherein the non-corrosive fluid delivered to the space between the shell and the inner container is ammonia and the corrosive fluid in the inner container is ammonium carbamate, said ammonium carbamate being derived from reaction between ammonia delivered to the distributor by the ingress means and carbon dioxide delivered from a position outside the shell to a position adjacent the lower edge of the distributor.

References Cited in the file of this patent

UNITED STATES PATENTS

| | | |
|---|---|---|
| 1,463,280 | Arnold et al. | July 31, 1923 |
| 1,735,107 | Claude et al. | Nov. 12, 1929 |
| 1,803,306 | Stengel | Apr. 28, 1931 |
| 1,855,040 | Almquist | Apr. 19, 1932 |
| 1,855,134 | L'Heure | Apr. 19, 1932 |
| 1,868,106 | Kuss et al. | July 19, 1932 |
| 1,884,880 | Saunders | Oct. 25, 1932 |
| 1,893,492 | Brill | Jan. 10, 1933 |
| 2,087,980 | Lawrence | July 27, 1937 |
| 2,462,995 | Ritzmann | Mar. 1, 1949 |